United States Patent [19]

Brown

[11] 4,273,153
[45] Jun. 16, 1981

[54] VIBRATION RESISTANT PRESSURE ACTUATED VACUUM BREAKER

[75] Inventor: J. James Brown, Red Bank, N.J.

[73] Assignee: Girard Equipment, Inc., Rahway, N.J.

[21] Appl. No.: 82,679

[22] Filed: Oct. 9, 1979

[51] Int. Cl.³ .................... F16K 31/11; F16K 17/00
[52] U.S. Cl. .................. 137/454.5; 137/526; 137/529; 137/542; 137/522; 251/65
[58] Field of Search ............. 251/65; 137/514.3, 522, 137/542, 543.21, 526, 529, 454.5, 454.6

[56] References Cited

U.S. PATENT DOCUMENTS

| | | | |
|---|---|---|---|
| 422,385 | 3/1890 | Dennedy | 137/542 |
| 487,673 | 12/1892 | Jenks | 137/526 |
| 1,819,827 | 8/1931 | Thwaits | 137/526 |
| 2,016,278 | 10/1935 | Ehlers | 137/529 |
| 2,405,241 | 8/1946 | Smith | 137/526 |
| 3,462,119 | 8/1969 | Smith | 251/368 |
| 3,495,620 | 2/1970 | Raimondi et al. | 137/529 |
| 3,605,132 | 9/1971 | Lineback | 137/526 |
| 3,688,794 | 9/1972 | Bird et al. | 137/529 |
| 3,698,427 | 10/1972 | Baranowski, Jr. | 251/368 |
| 3,729,020 | 4/1973 | Koci et al. | 137/529 |

FOREIGN PATENT DOCUMENTS 2403508 8/1975 Fed. Rep. of Germany ........... 137/526
1186300 4/1970 United Kingdom ...................... 251/65

Primary Examiner—William R. Cline
Assistant Examiner—H. Jay Spiegel
Attorney, Agent, or Firm—Robert R. Jackson

[57] ABSTRACT

A vacuum breaker for use on a moving tank for allowing atmospheric air to enter the tank to relieve a reduced pressure condition in the tank. The vacuum breaker has a light-weight closure assembly including a closure member of relatively large area. The closure assembly is normally held closed by permanent magnets. The magnets and the light-weight construction of the closure assembly substantially prevent the vacuum breaker from opening due to vibration of the moving tank. However, the vacuum breaker opens readily in response to a relatively slight reduced pressure in the tank because of the large area of the closure member. The permanent magnets are shielded from undesirable proximity of ferrous objects to prevent the magnets from being drained. The vacuum breaker may be opened manually to test for a positive pressure condition in the tank.

13 Claims, 6 Drawing Figures

VIBRATION RESISTANT PRESSURE ACTUATED VACUUM BREAKER

BACKGROUND OF THE INVENTION

This invention relates to vacuum breakers, and more particularly to vacuum breakers for use on movable tanks for allowing atmospheric air to enter the tank to relieve a reduced pressure condition in the tank.

Tanks for carrying normally liquid products on the highway, by rail and on water are typically designed to withstand substantial positive internal pressure relative to atmospheric pressure. The resistance of such tanks to negtive or reduced internal pressure relative to atmospheric pressure, however, is typically much less. These tanks are therefore subject to considerable damage or even complete destruction due to implosion in the event that pressure in the tank falls significantly below atmospheric pressure, an event referred to herein as a reduced pressure condition in the tank.

A reduced pressure condition may result from any of a variety of circumstances. The tank may be loaded with a hot or warm product, and as the product cools, its vapor pressure decreases, thereby reducing pressure in the tank. Shifting of the product in the tank as the tank moves may create localized zones of reduced pressure in the tank. The tank may be cleaned with hot liquids or vapors, and if the tank is left closed after cleaning, pressure in the tank may fall substantially below atmospheric pressure when the tank cools. Changes in ambient temperature or pressure (e.g., due to a rapid change in altitude) may cause a reduced pressure condition in the tank. Inadvertent failure of those handling the tank to open the tank vents during unloading of the tank may also cause such a condition.

If the reduced pressure in the tank is great enough, it may cause implosion of the tank. This is both dangerous and costly. A full size highway tank trailer now costs approximately $50,000 new. The cost of repairing such a tank which has been extensively damaged by implosion may be $18,000 to $28,000.

Vacuum breakers for mounting on top of movable tanks for admitting atmospheric air to relieve a reduced pressure condition in the tank are known. Typically, these known vacuum breakers include a plate or other closure which is spring-biased against a closure seat. In theory the spring keeps the vacuum breaker closed until the difference between atmospheric pressure and the pressure in the tank is great enough to overcome the spring force, thereby opening the vacuum breaker and admitting air to the tank. In practice, however, these prior vacuum breakers have often been unsatisfactory.

Vacuum breakers on moving tanks are subject to considerable vibration as the tank moves along the highway, railway, or on rough water. Unless the spring is very strong (which may prevent the vacuum breaker from opening as required in response to relatively small reduced pressure conditions in the tank), the closure will be constantly opening as a result of this vibration. This so-called "road flutter" of the vacuum breaker fatigues and weakens the spring so that the working life of the vacuum breaker is considerably shortened. Road flutter is also environmentally undesirable in that it may allow product and product vapor to escape from the tank. Many of the products carried in such tanks (e.g., strong acids, bases, volatile petroleum products and the like) are extremely hazardous, corrosive and environmentally unsafe. In addition to its environmental unacceptability, the escape of product and product vapor from the tank may interfere with operation of the vacuum breaker, e.g., as a result of product residues accumulating in the vacuum breaker. Such residues may either leave the vacuum breaker permanently open (permiting continued escape of product or product vapor), or effectively sealed closed (so that the vacuum breaker can no longer perform its function and the tank is again subject to implosion).

In view of the foregoing, it is an object of this invention to provide improved vacuum breakers for movable tanks.

It is a more particular object of this invention to provide vacuum breakers for movable tanks which are highly resistant to opening due to vibration of the tank (road flutter), but which open readily in response to relatively small reduced pressure conditions in the tank.

SUMMARY OF THE INVENTION

These and other objects of the invention are accomplished in accordance with the principles of the invention by providing a vacuum breaker having a relatively light-weight closure assembly including a closure member having relatively large area. The closure assembly is held closed in the absence of reduced pressure in the tank by the mutual attraction of two permanent magnets, one magnet being included in the closure assembly and the other magnet being mounted on the vacuum breaker housing above the closure assembly. The force of attraction between the two magnets is overcome by a relatively small reduced pressure condition in the tank and the vacuum breaker opens to admit atmospheric air to relieve the reduced pressure condition. The permanent magnets are protected from deterioration due to possibly corrosive environmental conditions and the proximity of ferrous objects such as tools by a shielding assembly of corrosion resistant, nonmagnetic material such as Teflon (i.e., polytetrafluorethylene) which substantially encloses the magnets and which is sufficiently extensive so that at least a substantial portion of the magnetic field set up by the magnets is within the shield. A return spring may be provided to assist in closing the vacuum breaker after it has been opened. Manually operable means accessible from outside the vacuum breaker may be provided for manually opening the vacuum breaker to test for a positive pressure condition in the tank.

Further features of the invention, its nature and various advantages will be more apparent from the accompanying drawing and the following detailed description of the invention.

DETAILED DESCRIPTION OF THE INVENTION

Figure 1:
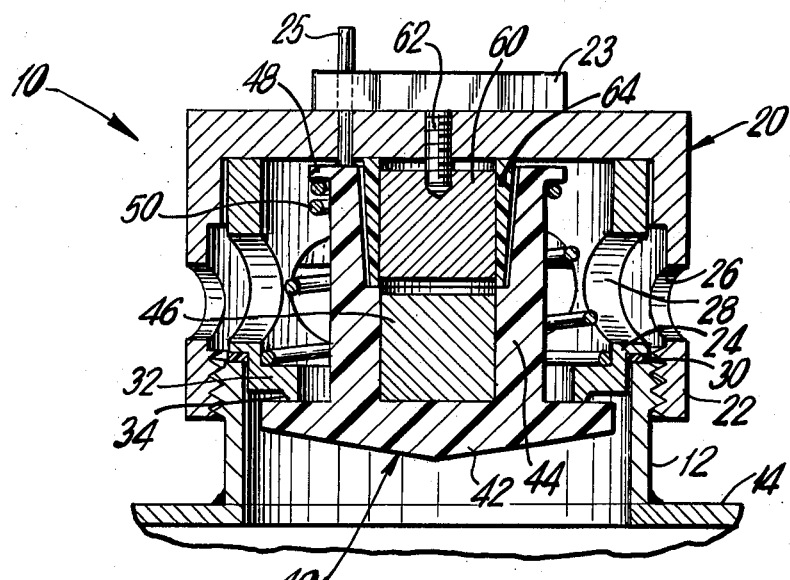
FIG. 1 is a vertical cross sectional view of one embodiment of a vacuum breaker constructed in accordance with the principles of this invention and showing the vacuum breaker in the closed condition.

In the illustrative embodiment shown in FIG. 1, the vacuum breaker 10 of this invention is mounted on upstanding cylindrical shank 12 on the top of tank 14 above the level to which the tank is normally filled with product. Vacuum breaker 10 communicates with the interior of tank 14 via shank 12. Tank 14, shank 12 and vacuum breaker 10 may be of any size. For example, for tank truck trailers, shank 12 typically has a three inch inside diameter and vacuum breaker 10 is proportioned accordingly.

Vacuum breaker 10 is vertically cylindrical. The vacuum breaker comprises vertically cylindrical housing assembly 20 including outer housing 22 and concentric inner housing 24. Outer housing 22 is threaded onto the upper end of shank 12. Hexagonal nut 23 is formed integrally on the roof of outer housing 22 so that a wrench can be used in mounting or removing the vacuum breaker. If desired, vertically reciprocal pin 25 may be provided through the roof of outer housing 22 with its lower end resting on a top portion of closure assembly 40 (described below) to provide manually operable means accessible from outside the housing to open the vacuum breaker. In this way the tank can be safely tested for a positive pressure condition before the vacuum breaker is loosened or removed. Vacuum breaker 10 preferably has a relatively low vertical profile so that it does not project excessively above the top of tank 14. When used on a tank truck, for example, vacuum breaker 10 must not project above the overturn protection on top of the tank.

Housing assembly 20 is vented to the atmosphere via aligned ports 26 and 28 formed respectively in the side walls of outer and inner housings 22 and 24. A removable protective shroud (not shown) in the shape of an inverted cup may be provided over the vacuum breaker to help keep water and dust out of the vacuum breaker. The sides of this shroud are spaced radially outward from the sides of the vacuum breaker and the lower periphery of the shroud does not extend down to tank 14 so that the flow of air into the vacuum breaker is not impeded.

When the vacuum breaker is not mounted on shank 12, inner housing 24 is removable from outer housing 22 to permit complete disassembly of the vacuum breaker. When the vacuum breaker is mounted on shank 12 as shown in FIG. 1, inner housing 24 is pressed down by the roof of outer housing 22 so that a lower annular surface of inner housing 24 compresses annular gasket 30 against the top of shank 12 to provide a fluid-tight seal between the vacuum breaker and shank 12. Inner housing 24 has a downwardly depending cylindrical portion 32 terminating at its lower extremity in a downward facing annular closure seat 34.

With the exception of gasket 30, all of the parts described so far are typically made of metal such as aluminum, malleable iron or stainless steel. Stainless steel may be preferred in some applications because of its high corrosion resistance. At least outer housing 22 is preferably of heavy construction so that the vacuum breaker assembly can withstand the rough treatment to which such equipment is typically subjected. Gastet 30 is preferably made of a somewhat compressible, heat and corrosion resistant material such as Teflon (i.e., polytetrafluorethylene).

Figure 2:
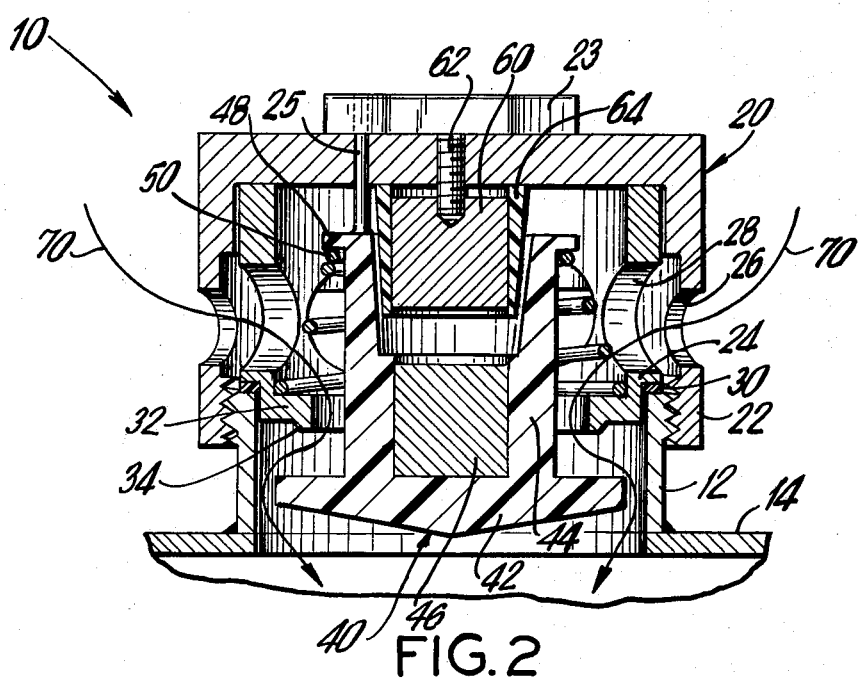
FIG. 2 is similar to FIG. 1 but shows the vacuum breaker in the open condition.

Inside housing assembly 20 is a vetically reciprocal closure assembly 40. Closure assembly 40 includes a disc-like lower closure member 42 of relatively large area which is cooperable with closure seat 34 to close the vacuum breaker when the closure assembly is in its uppermost position as shown in FIG. 1. Although closure member 42 has a relatively large area, its area is less than the inside cross sectional area of shank 12 so that when the vacuum breaker is open as shown in FIG. 2, air can pass readily around the closure member and into tank 14. The lower surface of closure member 42 may have the shape of downward pointing cone as shown in FIG. 1 to promote the return of product, which may splash up on to the vacuum breaker, to the tank.

Closure assembly 40 further includes permanent magnet 46 centrally mounted above closure member 42. The polar axis of permanent magnet 46 is vertically aligned so that one of its poles faces upward. The side (or nonpolar) surfaces of magnet 46 are surrounded by a cylindrical stem 44 extending vertically upward from a central portion of closure member 42. Stem 44 also extends upwardly adjacent the side (or nonpolar) surfaces of a second permanent magnet 60 (described below). Stem 44 is concentrically disposed within inner housing 24 and has an outer periphery which is substantially smaller than the inner periphery of inner housing 24. Stem 44 forms at least part of a shielding assembly substantially surrounding magnets 46 and 60.

For reasons which are given below, closure member 42 and stem 44 are preferably of a light-weight, nonmagnetic material. Closure member 42 and stem 44 are also preferably of a heat and corrosion resistant material. Teflon is a preferred material having all of the foregoing characteristics. Although closure member 42 is shown solid in FIG. 1, it may alternatively be made hollow and in addition may be filled with a soft rubber material to increase its flexibility and improve the seal between the closure member and closure seat 34.

The upper end of stem 44 has a radially outwardly extending flange 48. A helical compression spring 50 is seated on an inwardly projecting shoulder on the lower portion of inner housing 24. The upper end of spring 50 engages the underside of flange 48. Although spring 50 may exert some upward force on closure assembly 40 when the vacuum breaker is closed as shown in FIG. 1, the primary purpose of spring 50 is to exert an upward return force on the closure assembly when the vacuum breaker is open as shown in FIG. 2. Spring 50 is preferably a corrosion resistant material such as stainless steel.

Directly above permanent magnet 46 is a second permanent magnet 60 mounted on the inside of the roof of outer housing 22 by means of threaded lug 62. The polar axis of permanent magnet 60 is also vertically aligned so that one of its poles faces downward. The polarities of the adjacent poles of magnets 46 and 60 are opposite so that the magnets attract one another. The side (or nonpolar) surfaces of magnet 60 are surrounded by shield member 64, which is in turn surrounded by the upper portion of stem 44. The outer surface of shield member 64 and the adjacent inner surface of stem 44 cooperate to guide the vertical reciprocal motion of closure assembly 40 and keep the closure assembly centered in housing assembly 20. However, shield member 64 and stem 44 do not fit together so tightly that they prevent easy operation of the vacuum breaker or the continuous application of atmospheric pressure to the entire upper surface of the closure assembly. In addition, the lower extremity of shield member 64 cooperates with a shoulder on the interior of stem 44 to keep the opposing faces of magnets 46 and 60 slightly separated. This again assures continuous application of atmospheric pressure to the entire upper surface of the closure assembly and facilitates separation of the magnets when the vacuum breaker opens as described below. Shield member 64 is preferably of a nonmagnetic, heat and corrosion resistant material such as Teflon.

In an alternative arrangement (not shown), shield member 64 is in the shape of an inverted cup which is threaded onto lug 62, and magnet 60 is press fitted into the open end of member 64. This avoids the need for tapping magnet 60 as may be undesirable when certain types of magnets are used. Magnet 60 and shield 64 may also be mounted without the use of lug 62 by such other means as epoxy resins.

Magnets 46 and 60 are chosen so that the magnetic attraction force between them holds closure assembly 40 firmly up in the closed position shown in FIG. 1 in the absence of a reduced pressure condition in tank 14. Moreover, closure assembly 40 is a light-weight construction in minimize the inertial forces acting on it due to vibration of the vacuum breaker when the tank is in motion. For this purpose, closure member 42 and stem 44 are preferably of a light-weight material such as Teflon as mentioned above. As described in greater detail below, the vacuum breaker can be readily designed to remain closed (in the absence of reduced pressure in tank 14) despite accelerations tending to open the vacuum breaker (i.e., upward acceleration or downward deceleration of the vacuum breaker) equal to from about 4 to 25, preferably at least about 8, times gravitational acceleration. Accordingly, the vacuum breaker of this invention is highly resistant to road flutter.

On the other hand, magnets 46 and 60 are chosen and the vacuum breaker is otherwise designed so that a relatively small difference between atmospheric pressure and a reduced pressure inside tank 14 overcomes the magnetic attraction force, thereby causing closure assembly 40 to drop down to the position shown in FIG. 2. Because the primary closure force is the force of attraction between magnets 46 and 60, and because magnetic attraction decreases very rapidly with distance between the magnets, the vacuum breaker tends to open rapidly and completely once opening is initiated. In the open position shown in FIG. 2, closure member 42 is separated from closure seat 34 and atmospheric air flows rapidly into the tank through the large opening in the vacuum breaker along paths typified by lines 70. Because of the relatively large area of the closure member, the vacuum breaker of this invention can be designed to open in response to a relatively slight reduced pressure condition. As an example, also described in greater detail below, the vacuum breaker can be made to open when the pressure in tank 14 is as little as 1 p.s.i. or less below atmospheric pressure. The pressure differential at which the vacuum breaker opens can be precisely controlled by adjusting the gap between magnets 46 and 60 in FIG. 1. Moreover, because of the light-weight construction of closure assembly 40, this extreme sensitivity and precision of operation can be combined with the substantial resistance to road flutter described above.

When the reduced pressure condition in tank 14 which caused the vacuum breaker to open as just described has been relieved by admission of a sufficient quantity of air, spring 50 and magnets 46 and 60 cooperate to return closure assembly 40 to its initial closed position shown in FIG. 1.

Because spring 50 is not subjected to continual flexing due to road flutter and is used primarily to help return the closure assembly to the closed position, the operation of the spring is much less critical than in prior vacuum breakers and the life of the spring is greatly extended. The life of permanent magnets 46 and 60 is also extended by the presence of the shielding assembly including the closure assembly stem 44 and shield member 64. This shielding assembly substantially encloses both magnets at all times during operation of the vacuum breaker so that they are not exposed to any possible corrosive product or product vapor. In addition, this shielding, which in the embodiment shown in FIG. 1 is nonmagnetic, protects the magnets from contact with ferrous objects (e.g., iron and steel tools) which are commonly used in the environment of the vacuum breaker and which can cause gradual weakening of the magnets if allowed to come too close to the magnets. Each time such an object comes close to a permanent magnet, the magnet performs work on the object to at least partially magnetize it. The work done by the magnet depletes the strength of the magnet.

Figure 3:
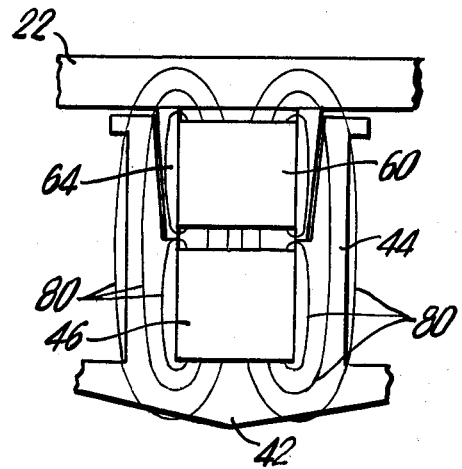
FIG. 3 is a view of part of the apparatus of FIG. 1 showing the magnetic field set up by the magnets in the apparatus.

To prevent this weakening of the magnets in the vacuum breaker of the present invention, sufficient shielding is provided around the magnets so that at least a substantial portion of the magnetic field set up by the magnets is within the shielding assembly. This is illustrated in FIG. 3, wherein only magnets 46 and 60 and the surrounding shielding are shown. Also shown in FIG. 3 are lines of force 80 representing the magnetic field set up by the magnets. Most of the lines of force either pass through the shielding members 44, 64 or the space enclosed by those members. Accordingly, most of the magnetic energy is within the shielding assembly and ferrous objects are kept at sufficient distance from the magnets to substantially prevent draining of the magnets.

Magnets 46 and 60 may be any suitable conventional permanent such as alnico magnets (i.e., generally carbon-free aluminum-nickel-cobalt-steel alloys) or ferrite magnets (i.e., generally multiple oxides of ferric oxide with another oxide, preferably in ceramic form). To minimize the weight of the closure assembly 40, at least magnet 46 preferably has a high magnetic strength to weight ratio. Ferrite magnets are preferred for this reason and because they are highly corrosion resistant. Ferrite magnets are also preferred because they are currently less expensive and more readily available than alnico magnets. A particularly preferred ferrite magnet is F830 formula ferrite which is an anistropic strontius ferrite (believed to comprise iron oxide, barium, and strontium carbonate) available from the D. M. Steward Manufacturing Company, East 36th Street, Chattanooga, Tenn. 37407. This material has high residual induction, energy storage and coercive force, and is also less brittle than many other ferrite materials. The magnetization of this material is also highly directional and resistant to contamination or less.

The equation representing the equilibrium condition of the vacuum breaker in the closed condition is:

$$M+S=W+PA+ma \tag{1}$$

where M is the upward magnetic force on the closure assembly, S is the upward return spring force on the closure assembly, W is the weight of the closure assembly (i.e., the weight of elements 42, 44 and 46), P is the difference between atmospheric pressure outside the tank and a reduced pressure inside the tank, A is the area of closure member 42 bounded by closure seat 34, m is the mass of the closure assembly, and a is an acceleration tending to open the vacuum breaker (i.e., an upward acceleration or downward deceleration of the vacuum breaker due to vibration of the tank).

Assuming that the return spring force S is approximately zero when the vacuum breaker is closed, and initially assuming that the pressure inside the tank is equal to atmospheric pressure, equation (1) becomes:

$$M = W + ma \tag{2}$$

Solving equation (2) for acceleration a and expressing the mass m in terms of W (i.e., $m = W/g$) yields:

$$a = g\,M/W - g \tag{3}$$

where g is acceleration due to gravity (approximately 32 ft/sec/sec). Dividing both sides of equation (3) by g yields:

$$x = M/W - 1 \tag{4}$$

where x is the number of multiples of gravitational acceleration g (i.e., $x = a/g$) at which the vacuum breaker will open in the absence of reduced pressure in the tank. The value of x from equation (4) is therefore a measure of the vibration resistance of the vacuum breaker.

In order to provide a vacuum breaker with good vibration resistance, closure assembly 40 is designed to be light in weight relative to the magnetic force M. Typically the ratio of M to W is at least 5, preferably at least 9, and may be as high as 26 or more. Stated another way, x from equation (4) is typically at least 4, preferably at least 8, and may be as high as 25 or more. In a typical vacuum breaker constructed as described herein for a three inch shank 12, the weight W of the closure assembly may be about 6 oz. (0.375 lb.), and the magnetic force M can be readily chosen to be anywhere from about 2 to 10 lb. depending on the size, strength, initial spacing, etc., for magnets 46 and 60. Accordingly, the vacuum breaker can be designed to withstand acceleration due to vibration of anywhere from about 4 to over 25 times gravitational acceleration. These numbers can be increased with the addition of some return spring force S. For example, with a magnetic force M of 10 lb. and a return spring force S of 2 lb., the vacuum breaker will withstand acceleration due to vibration of about 31 times gravitational acceleration. As mentioned above, the vacuum breaker is preferably designed to remain closed in the absence of reduced pressure in the tank despite acceleration due to vibration of at least about 8 times gravitational acceleration.

Considering now the pressure sensitivity of the vacuum breaker, the diameter of the closure seat 34 in a vacuum breaker designed for a three inch shank is approximately 2 in. Accordingly, the area A in equation (1) is approximately 3.14 sq. in. Again, assuming $S = 0$, $W = 0.375$ lb., and now ignoring inertial forces due to vibration, the magnetic force M which will allow the vacuum breaker to open at a pressure differential P of 1 p.s.i. is calculated from equation (1) as follows:

$$M = W + PA = 0.375 + 3.14 = 3.515 \tag{5}$$

Using this value of M in equation (4) with the same value of W yields x approximately equal to 8. Thus the vacuum breaker of this invention can be readily designed to open at a pressure difference of as little as 1 p.s.i., while remaining closed in the absence of a reduced pressure condition despite very substantial acceleration due to vibration (e.g., vibrational acceleration in excess of 8 times gravitational acceleration). If the vacuum breaker were desired to open at a pressure differential P of 0.5 p.s.i., M would be 1.945 and x would be about 4. If the vacuum breaker were intended to open at $P = 2$ p.s.i., M would be 6.655 and x would be over 16.

The foregoing equations and examples illustrate how the several design parameters of the vacuum breaker of this invention can be varied to meet any of a wide range of operating requirements.

Figure 4:
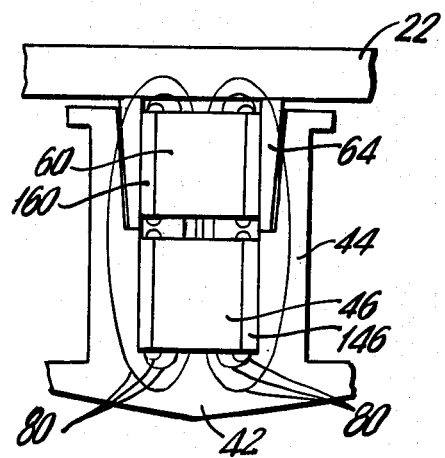
FIG. 4 is a view similar to FIG. 3 showing a modification which can be made in accordance with the principles of the invention.

A preferred alternative embodiment of the magnets and shielding assembly is shown in FIG. 4. In this embodiment the side surfaces of magnets 46 and 60 are each surrounded by a hollow cylindrical collar 146 and 160, respectively, of high permeability material, preferably stainless steel. As will be apparent, these collars form part of the shielding assembly for the magnets. The magnets and associated collars are in turn substantially enclosed in the nonmagnetic, preferably Teflon, portions 44 and 64 of the shielding assembly as in the previously described embodiment. Collars 146 and 160 have the effect of concentrating within themselves a large portion of the magnetic fields set up by the magnets. This effect is represented in FIG. 4 by the magnetic lines of force 80. As a result, a much smaller portion of the magnetic field extends beyond the immediate vicinity of the magnets and associated collars, and much of this field passes through the nonmagnetic portions 44, 64 of the shielding assembly. This embodiment affords even greater protection to the magnets from the draining effects of ferrous objects in the proximity of the vacuum breaker. Collars 146 and 160 also provide mechanical protection for magnets 46 and 60, as may be particularly desirable when certain ferrite magnets are used.

Figure 5:
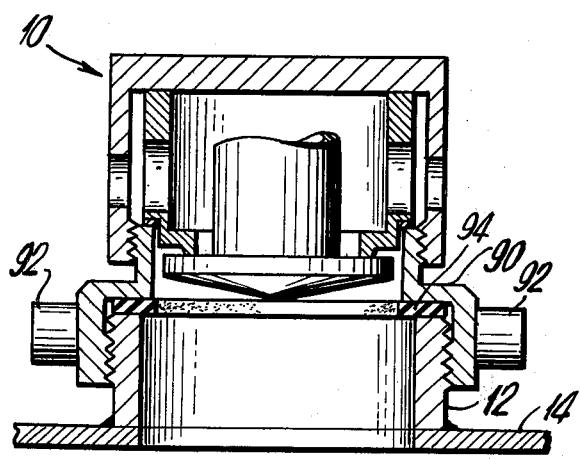
FIGS. 5 and 6 are simplified vertical cross sectional views of the vacuum breaker of FIG. 1 showing alternative means of mounting the vacuum breaker on a tank.
Figure 6:
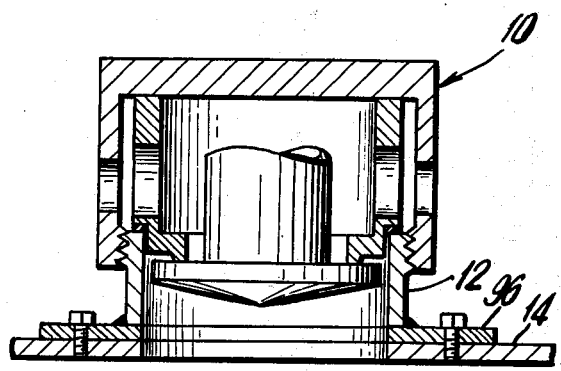

Alternative mountings for the vacuum breaker are shown in FIGS. 5 and 6. In FIG. 5, vacuum breaker 10 is mounted on swivel ring 90 which is mounted in turn on a shank 12 similar to shank 12 in the embodiment described above. Swivel ring 90 is threaded onto shank 12 with an intermediate gasket 94, and vacuum breaker 10 is threaded onto the swivel ring. Swivel ring 90 includes outwardly projecting lugs 92 to facilitate mounting or removing the swivel ring. When vacuum breaker 10 is removed with swivel ring 90, the swivel ring keeps the vacuum breaker assembled, i.e., the presence of the swivel ring prevents the inner housing from dropping out of the outer housing.

In FIG. 6, shank 12 is welded to a mounting plate 96 which is bolted on the top of tank 14. Vacuum breaker 10 is threaded onto shank 12 as in the first embodiment described above, or the swivel ring 90 shown in FIG. 5 may be used between shank 12 and the vacuum breaker.

It is to be understood that the embodiments shown and described herein are merely illustrative of the principles of the invention, and that various modifications can be made by those skilled in the art without departing from the scope and spirit of the invention. For example, various types of magnets can be used with or without high permeability collars as described above.

I claim:

1. A pressure actuated vacuum breaker for mounting on the top of a movable tank above the level to which the tank is normally filled with product for admitting atmospheric air to the tank to relieve a reduced pressure condition occurring in the tank while substantially preventing the escape of product or product vapor from the tank via the vacuum breaker, the vacuum breaker being highly resistant to opening due to vibration associated with movement of the tank, comprising:

a housing communicating with the interior of the tank and vented to the atmosphere;

a downward facing closure seat disposed in the housing between the interior of the tank and the vent to the atmosphere;

a light-weight, vertically reciprocal closure assembly disposed in the housing and including a closure member cooperable with the closure seat to close the vacuum breaker and a first permanent magnet mounted on the closure member and having an upward facing pole;

a second permanent magnet mounted in the housing above the first permanent magnet and having a downward facing pole so that the first and second magnets attract one another with a magnetic force equal to at least about 5 times the weight of the closure assembly to hold the closure member up against the closure seat and thereby maintain the vacuum breaker closed in the absence of reduced pressure in the tank and in spite of accelerations due to vibration up to at least about 4 times gravitational acceleration tending to open the vacuum breaker, the force of attraction between the magnets being overcome and the closure assembly moving downward to open the vacuum breaker when a reduced pressure condition occurs in the tank;

a shielding assembly disposed in the housing and substantially surrounding the first and second magnets at all times during operation of the vacuum breaker; and spring means for exerting an upward return force on the closure assembly to assist in closing the vacuum breaker after it has opened.

2. The apparatus defined in claim 1 wherein the shielding assembly extends perpendicular to the polar axes of the first and second magnets so that at least a substantial portion of the magnetic field set up by the magnets is within the shielding assembly.

3. The apparatus defined in claim 1 wherein the shielding assembly includes a first shield member extending upward from the closure member and substantially surrounding the side surfaces of the first and second magnets.

4. The apparatus defined in claim 3 wherein the shielding assembly includes a second shield member fixed relative to the housing and substantially surrounding the side surface of the second magnet.

5. The apparatus defined in claim 4 wherein the second shield member fits inside the upper portion of the first shield member, the outer surface of the second shield member and the adjacent inner surface of the first shield member cooperating to guide the vertical motion of the closure assembly.

6. The apparatus defined in claim 5 wherein the shielding assembly further includes first and second collars of high permeability material respectively surrounding the side surfaces of the first and second magnets.

7. The apparatus defined in claim 1 wherein the closure member and the shielding assembly are polytetrafluoroethylene.

8. The apparatus defined in claim 1 wherein the ratio of the force of magnetic attraction between the first and second permanent magnets when the vacuum breaker is closed to the weight of the closure assembly is in the range from 5 to 26.

9. The apparatus defined in claim 8 wherein the vacuum breaker opens in response to a reduced pressure condition in the tank in the range from 0.5 to 2 p.s.i. below atmospheric pressure.

10. The apparatus defined in claim 8 wherein said ratio is at least 9.

11. The apparatus defined in claim 1 wherein the vacuum breaker opens in response to a reduced pressure condition in the tank in the range from 0.5 to 2 p.s.i. below atmospheric pressure.

12. The apparatus defined in claim 1 wherein the vacuum breaker opens in response to a reduced pressure condition in the tank of about 1 p.s.i. below atmospheric pressure, but remains closed in the absence of a reduced pressure condition in the tank despite acceleration tending to open the vacuum breaker at least 8 times gravitational acceleration.

13. The apparatus defined in claim 1 further comprising manually operable means for opening the vacuum breaker from outside the housing to test for a positive pressure condition in the tank.

* * * * *